US010270608B2

(12) United States Patent
Gloanec et al.

(10) Patent No.: US 10,270,608 B2
(45) Date of Patent: Apr. 23, 2019

(54) METHOD FOR MANAGING ALERTS RELATING TO THE DETECTION OF A LOCAL PHENOMENON

(71) Applicant: Orange, Paris (FR)

(72) Inventors: Simon Gloanec, Rennes (FR); Herve Marchand, Vern sur Seiche (FR)

(73) Assignee: ORANGE, Paris (FR)

( * ) Notice: Subject to any disclaimer, the term of this patent is extended or adjusted under 35 U.S.C. 154(b) by 10 days.

(21) Appl. No.: 15/563,822

(22) PCT Filed: Mar. 18, 2016

(86) PCT No.: PCT/EP2016/056043
§ 371 (c)(1),
(2) Date: Oct. 2, 2017

(87) PCT Pub. No.: WO2016/156072
PCT Pub. Date: Oct. 6, 2016

(65) Prior Publication Data
US 2018/0069717 A1 Mar. 8, 2018

(30) Foreign Application Priority Data
Mar. 31, 2015 (FR) ...................... 15 52767

(51) Int. Cl.
*H04L 12/18* (2006.01)
*G08B 21/10* (2006.01)
*H04L 12/28* (2006.01)

(52) U.S. Cl.
CPC .......... *H04L 12/1895* (2013.01); *G08B 21/10* (2013.01); *H04L 12/2803* (2013.01)

(58) Field of Classification Search
None
See application file for complete search history.

(56) References Cited

U.S. PATENT DOCUMENTS 8,620,841 B1 12/2013 Filson et al.
8,988,232 B1 3/2015 Sloo et al.
(Continued)

OTHER PUBLICATIONS

Chris Davies, "Nest Protect Smart Smoke Detector Packs WiFi" Oct. 8, 2013, Slash Gear, https://www.slashgear.com/nest-protect-smart-smoke-detector-packs-wifi-08300586/.*
(Continued)

*Primary Examiner* — Brian A Zimmerman
*Assistant Examiner* — Sara B Samson
(74) *Attorney, Agent, or Firm* — David D. Brush; Westman, Champlin & Koehler, P.A.

(57) ABSTRACT

A method for managing alerts relating to the detection of a local phenomenon in a communications network. The communications network includes at least one first residential gateway capable of transmitting alert messages in the network. The local phenomenon is likely to degrade the hardware and/or software resources of the residential gateway. The method includes: detection, by the first residential gateway, of a degradation linked to the local phenomenon; transmission of an alert message in the network by the first residential home gateway, in order for at least one second residential gateway able to receive the alert message, adjacent to the first residential gateway in the wide area network, to respond to the local phenomenon.

13 Claims, 2 Drawing Sheets

(56) References Cited

U.S. PATENT DOCUMENTS

2016/0195864 A1* 7/2016 Kim .................. G05B 15/02
                                                            709/221
2017/0374113 A1* 12/2017 Booth .................. H04W 4/70

OTHER PUBLICATIONS

International Search Report dated May 27, 2016 for corresponding International Application No. PCT/EP2016/056043, filed Mar. 18, 2016.
Written Opinion of the International Searching Authority dated May 27, 2016 for corresponding International Application No. PCT/EP2016/056043, filed Mar. 18, 2016.

* cited by examiner

METHOD FOR MANAGING ALERTS RELATING TO THE DETECTION OF A LOCAL PHENOMENON

This Application is a Section 371 National Stage Application of International Application No. PCT/EP2016/056043, filed Mar. 18, 2016, the content of which is incorporated herein by reference in its entirety, and published as WO 2016/156072 on Oct. 6, 2017, not in English.

TECHNICAL FIELD

The field of the invention is that of telecommunications, and more precisely that of devices susceptible to damage due to geographically localized phenomena.

More particularly, the invention relates to the protection of such devices against damage linked to lightning, for example.

PRIOR ART

A large number of telecommunication terminals are destroyed each year by local phenomena, this representing a significant cost, in particular for telecommunication operators. A local phenomenon is understood essentially to mean natural phenomena with a limited geographical scope, such as lightning, fires, earthquakes, etc. The invention may, however, be expanded to other local phenomena that are not necessarily natural (hacker attacks, etc.).

Hereinafter, we will concern ourselves more particularly with lightning.

Lightning strikes are characterized by an abrupt passage, when a discharge occurs, of a significant impulse current at the location of the discharge. The electric lightning current brings about the same effects as any other current flowing in a conductor (Joule effect, induction effect, etc.) with a direct effect on the device it reaches, but also an indirect effect through induction on other devices: a lightning strike is able to propagate through guides or through electromagnetic radiation and bring about localized overvoltages in proximate devices, via electric cables. In the case of a home gateway linked both to the electrical grid (for its power supply) and to the Internet (for its communication with the other devices of the network), the risk of damage is high.

One simple means for protecting against the direct effects is to attract the lightning to a precise point (for example by using a lightning conductor) so as to draw the current toward the ground, but this does not solve the problem of induction.

Another means consists in disconnecting the device under threat so that it is not damaged by the lightning current. However, in order to disconnect it, it is necessary to be aware of the approach of the lightning and to react quickly, but the natural phenomenon of lightning is random. The same applies for other fire-type local phenomena, whether they be natural or not.

In order to make it known that lightning is imminent, a certain number of detection systems are provided. For example, the Météorage network is a French national network for monitoring storms that covers all of the French territories and those bordering them. It is formed of a set of detection stations that detect lightning strikes and send their information to a real-time processing center. As soon as a station captures an electromagnetic signal, it determines the direction of the lightning bolt and immediately transmits this information to the Météorage operational center. This is therefore a centralized prevention system. This system is complex to implement, as it requires a set of stations and a centralized server. What is more, it assumes that the connection remains valid for the communication between the detection stations and the server. Now, as lightning is able to partially damage the network card of these devices, the latter potentially no longer have a connection at the instant when the fault occurs, thereby preventing them from communicating with a centralized server.

What is more, lightning phenomena are highly geographically localized. It is therefore often unnecessarily complex to have monitoring with a wide geographical scope.

The invention offers a solution that does not have the drawbacks of the prior art.

THE INVENTION

To this end, according to one functional aspect, one subject of the invention is a method for managing alerts relating to the detection of a local phenomenon in a wide area communications network comprising at least one first home gateway able to send alert messages in the network, the local phenomenon being liable to damage the hardware and/or software resources of said home gateway, characterized in that it performs the following steps:
  detection, by the first home gateway, of damage linked to the local phenomenon;
  sending, by said first home gateway, in the network, of an alert message for management of the local phenomenon by at least one second home gateway, able to receive the alert message, near said first home gateway in the wide area network.

The invention thus offers the advantage of creating a simple and local system for transmitting alerts for a local phenomenon, for example lightning, based on the despatching of alert messages in the network to the devices near the one that has been struck by lightning. These alerts may for example serve to inform the user of the device of the presence of lightning in geographical proximity, and to prompt him to temporarily disconnect his device in order to protect it. Nearby device is understood to mean a receiving device that is located in the same network in proximity to the sending device, and is therefore also liable to be damaged by this local phenomenon, that is to say that the two devices are separated by a short distance, for example of the order of a few hundred meters. Advantageously in this case, the sending time is very short and enables a short response time on the part of the receiving device and/or of its user.

According to a first particular mode of implementation, the method such as described above is furthermore characterized in that the message is sent by way of a radio communication channel, and the second home gateway is near the first if it is located within the range of the radio communication.

Advantageously, the sending of the alert message is thus naturally able to be limited to the devices that are located in proximity to the sending device, since the physical medium for the message, that is to say the range of the radio communication channel, is limited in terms of distance: for example, a message broadcast on a wireless link (Wi-Fi, DECT, etc.) is not able to exceed a few tens of meters, and reaches only the devices that are located within the range of the radio communication. For example, with Wi-Fi, the range reaches a few tens of meters indoors and about one hundred meters outdoors. The range also defines what is termed the zone of coverage of the message sender. In such a case of a broadcast message, there is no need to calculate the distance between the two devices, since the broadcast message will automatically reach only the devices that are close.

According to one variant of this first particular mode of implementation, the method such as described above is furthermore characterized in that the alert message is broadcast in the home network of the first home gateway.

Advantageously according to this variant, the alert message may be broadcast not only in the wide area network (WAN) but also in the local area network (LAN) controlled by the home gateway, such that the devices of the local area network are warned of the local phenomenon and that the user is able to act accordingly.

According to a second particular mode of implementation, the method such as described above is furthermore characterized in that it includes a step of acquiring at least one identifier of a nearby home gateway situated at a distance shorter than a threshold distance.

This mode of implementation of the invention makes it possible to acquire the identifiers of all of the devices that are nearby, or in proximity to the first, for example within a radius of one hundred meters, in order to transmit the alert message to all of these devices that are also liable to be damaged by the local phenomenon (e.g. lightning) that has just reached the first device or that has just been signaled thereto. The threshold distance may be defined in particular by the telecommunications operator, which thus unambiguously establishes the concept of vicinity: before sending an alert message, the device addresses for example a query to a server of the operator, which transmits to said device in response a list of nearby devices (defined for example by an address on the network). This acquisition may result in a more precise definition of the nearby devices than in the first mode of implementation in which alert messages are broadcast on a radio channel (Wi-Fi, DECT), since the range of such a channel depends on the environmental conditions (obstacles, weather conditions, etc.).

According to a third particular mode of implementation, which may be implemented alternatively or in addition to the preceding ones, a method such as described above is furthermore characterized in that the step of detecting damage is performed directly by the first home gateway.

According to this embodiment, it is the sending device itself that detects the damage that it has suffered (e.g. lightning current bringing about an overvoltage and damage to its electronic circuits). Thus, the first device that suffers the local phenomenon (lightning strike, fire, overvoltage, etc.) is able to transmit it to the nearby devices, which are warned of the geographical proximity of the phenomenon and are able to inform their user thereof.

According to a fourth particular mode of implementation, which may be implemented alternatively or in addition to the preceding ones, a method such as described above is furthermore characterized in that the step of detecting damage is performed by reception of at least one alert message.

In this embodiment, the device is not struck directly by the local phenomenon, but warned that the latter is imminent by an alert message. Thus, a second device that is warned of the proximity of lightning by an alert message sent by a first device according to the method is able to position itself as the first device according to the invention and retransmit the alert message to a third nearby device. The information is thus able to propagate progressively (recursively, by what are termed 'hops' in English, between nearby devices) via a network of devices.

According to a fifth particular mode of implementation, which may be implemented alternatively or in addition to the preceding ones, a method such as described above is furthermore characterized in that the alert message comprises a unique message identification.

In this embodiment, the unique message identification enables in particular a device positioned as receiver to recognize the message that it itself sent when said message returns to it through an implementation of the method of the invention on a proximate sending device. Specifically, it would be needless and costly to process this message a second time, and possibly to resend it, thereby possibly leading to a looping phenomenon.

According to a sixth particular mode of implementation, which may be implemented alternatively or in addition to the preceding ones, a method such as described above is furthermore characterized in that the alert message comprises a counter relating to the maximum number of resends of the alert message.

It is thus possible, according to this embodiment, to limit the progressive propagation of the information relating to the local phenomenon. It is possible for example to decide that an item of information transmitted progressively three times in the network will reasonably have reached all of the devices liable to be affected in a given geographical perimeter around the device that was reached by lightning. In this case, the counter of the number of resends will be set to the value three by the device hit by lightning.

According to one variant of this particular mode of implementation, a method such as described above is furthermore characterized in that the alert message is resent by a receiving home gateway as long as the resend number has not reached a threshold value.

This implementation variant of the invention enables a receiving device to update the value of the resend counter, for example by decrementing it, so that the propagation of the alert remains limited to a certain geographical vicinity. When the counter reaches a predefined threshold value, typically zero in the case of a decrementation, the message is not resent, and the propagation of the alert is stopped automatically.

According to a seventh particular mode of implementation, which may be implemented alternatively or in addition to the preceding ones, a method such as described above is furthermore characterized in that it includes
    a step of locating the first home gateway;
    a step of transmitting this location in combination with the alert message.

This embodiment of the invention makes it possible, through knowledge of one or more locations of devices damaged by the local phenomenon, to calculate a certain number of parameters of the phenomenon in order to inform the user thereof (distance of the storm, speed and direction of propagation, etc.).

According to one hardware aspect, the invention also relates to an appliance able to send alert messages relating to the detection of a local phenomenon in a wide area communication network, the local phenomenon being liable to damage the hardware and/or software resources of a first home gateway including the appliance, characterized in that it includes the following modules:
    a module for detecting damage linked to the local phenomenon;
    a module for locally sending, in the network, an alert message for management of the local phenomenon by at least one second home gateway, able to receive the alert message, near the first home gateway in the wide area network.

The term module may correspond equally to a software component or to a hardware component or to a set of software and hardware components, a software component itself corresponding to one or more computer programs or subroutines or, more generally, to any element of a program able to implement a function or a set of functions such as described for the modules in question. In the same manner, a hardware component corresponds to any element of a hardware assembly able to implement a function or a set of functions for the module in question (integrated circuit, chip card, memory card, etc.).

According to another hardware aspect, the invention also relates to a home gateway comprising an appliance such as described above.

According to another hardware aspect, the invention also relates to a computer program able to be implemented by an alert management method such as described above.

According to yet another hardware aspect, the invention pertains to a recording medium able to be read by a data processor and on which is recorded a program comprising program code instructions for the execution of the steps of the method defined above.

The invention will be better understood on reading the following description, given by way of example and with reference to the appended drawings.

THE FIGURES

DETAILED DESCRIPTION OF AN EXEMPLARY EMBODIMENT ILLUSTRATING THE INVENTION

Figure 1:
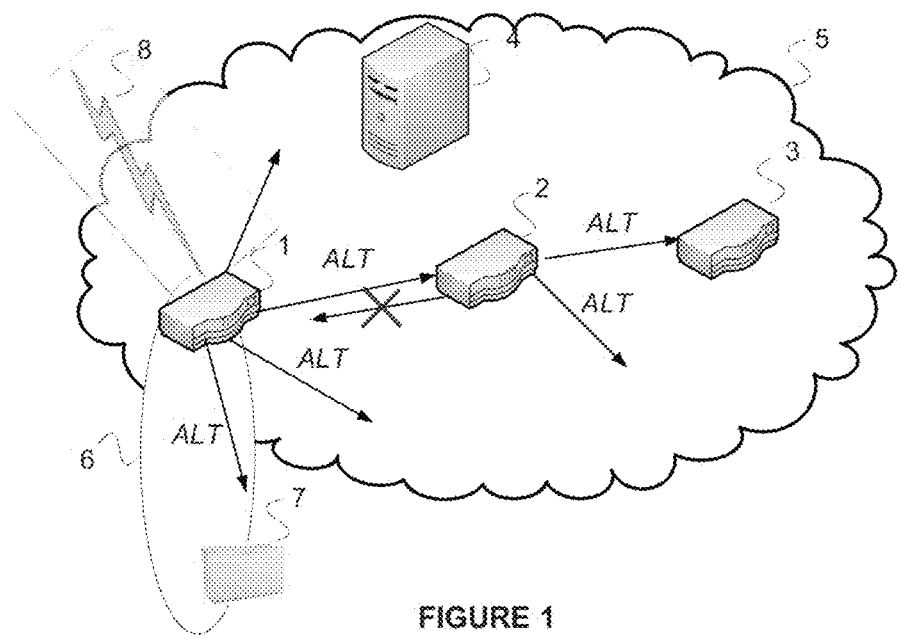
FIG. 1 shows a network configuration including three home gateways.

FIG. 1 shows a network configuration including three home gateways (1,2,3) each linked to a local area network (6, shown only for the gateway 1). It is recalled that a local area network, also termed home network, is an IT network that links together, in a wired or wireless manner, terminals (computers, peripheral printer, playback or storage devices, home automation devices, etc.) of a household that are able to communicate with each other. A home network generally includes a router device, also commonly termed home gateway, or service gateway, which is an intermediary element ensuring the redirection, or routing, of data packets between the various terminals and the networks (wide area network and local area network) that are connected thereto. Such a home network often connects the various terminals using Wi-Fi technology. It is recalled here that the designation Wi-Fi (for 'Wireless Fidelity') groups together wireless transmission technologies, making it possible to create wireless IT networks based on the standards of the IEEE 802.11 family. The network in this example is of 'IP' type. The local area network of the gateway 1 includes a freezer (7) in this example. According to this example, the service gateway (1) includes a Wi-Fi communication function that enables it to communicate in a wireless manner with the terminals of the local area network, and a link of ADSL type that enables it to communicate with the wide area Internet network. Alternatively, it is possible to use a radio technology of DECT type, which has a certain number of advantages over Wi-Fi: better range and robustness, lower consumption (in particular through the use of the DECT-ULE specifications). DECT (for Digital Enhanced Cordless Telecommunications) is a digital wireless telephony standard over a microwave frequency range, used in particular for voice communications. The 'DECT Ultra Low Energy' (abbreviated to DECT ULE) standard is an extension of the DECT wireless communication standard for low-energy applications.

The gateways (1,2,3) are controlled by the server (4) (or a set of servers) of the telecommunication operator. Such a server is in particular able to load the various software programs necessary for the invention onto the home gateways, to provide them with the geographical coordinates, the identifiers of the nearby gateways, etc.

According to this embodiment, the first gateway (1) is struck by lightning. The gateway (1) detects the lightning current, for example by using a specific software and/or hardware module able to detect an overvoltage generated by this lightning current on one of the electronic cards (see FIG. 2 for an exemplary description of such a module).

The first gateway then sends, using its Wi-Fi module, an alert message. This message is of broadcast type. This message typically includes a unique message identifier, a message type and a counter of the number of resends. It is assumed in this example that this counter is positioned at the value 2, this signifying that the number of sends will be two at most starting from the first gateway. This message reaches the nearby gateways, that is to say in this example those that are located within the radio range of the Wi-Fi (about one hundred meters). It will be noted that this message also reaches the terminals of the local area network, that is to say any appliance able to connect to the gateway (6) in the context of the local area network, such as a computer or an appliance of television set (TV), personal computer (PC), smartphone (smart mobile telephone), PDA ('Personal Digital Assistant'), online home appliance (refrigerator, freezer, radiator, etc.) type or, more generally, any appliance able to communicate in a wired or wireless manner with a service gateway. In this example, the freezer (7) receiving this broadcast alert message may for example warn the user that its content is endangered by imminent lightning. The user may take necessary measures.

A message broadcast using Wi-Fi may for example take the form of what is termed a beacon in English.

If DECT technology is used, it is also possible to broadcast such messages.

The second gateway (2) receives the broadcast alert by way of its Wi-Fi module. Upon reception of such a message, it takes a certain number of measures that have been provided for in its configuration: for example, it warns the user, who is able to take appropriate measures to protect his devices. Alternatively, it may also automatically cut the ADSL line (via a module for physically deactivating the line). It decrements the resend counter before inserting it into an alert message that is otherwise identical to the one that it received. This message is broadcast by way of the Wi-Fi module, and reaches the nearby gateways. In particular, in our example, it reaches the first and third gateways (1,3). The gateway 1 does not process it, as it recognizes the alert that it itself sent by virtue of the unique message identifier. This prevents it from processing the information a second time (as lightning never strikes the same location twice), and above all from resending the message.

The third gateway (3) receives the alert message, takes the necessary actions upon reception of such a message (alert signal intended for the user via a graphical or audio interface, isolation of the line, etc.) and decrements the resend counter, which then reaches the value 0. According to this example, the gateway (3) takes the necessary measures to protect itself, but does not resend the message as the maximum number of resends (2) has been reached.

Figure 2:
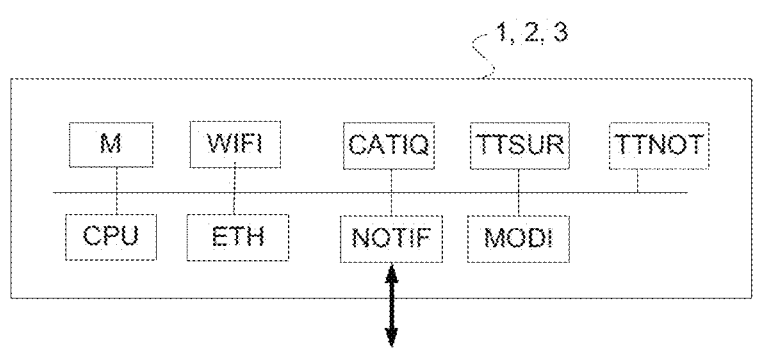
FIG. 2 is a schematic view of a home gateway according to one embodiment of the invention.

FIG. 2 is a schematic view of a home gateway according to the invention, such as for example one of the service gateways (1, 2, 3) of FIG. 1.

It comprises, as is conventional, memories (M) associated with a processor (CPU). The memories may be of ROM (from the English Read Only Memory) or RAM (from the English Random Access Memory) or indeed Flash type. The gateway communicates with the local area network and the wide area Internet network via the Ethernet module (ETH), on the one hand, and possibly the module WIFI for wireless communication. The service gateway furthermore comprises, in accordance with the invention, a plurality of hardware and software modules, enabling it to relay alert messages to the other nearby gateways or proximate devices (in the local area network) so that the user is made aware of the risk incurred to his devices (e.g. another home gateway, or a freezer of a local area network, etc.) and takes the appropriate steps. For example, in FIG. 2, this function is provided by the following modules:
- a module CATIQ, compatible with the technology of the same name, for wireless communications compatible with the DECT standard. CAT-iq (Cordless Advanced Technology—internet and quality) is a technology initiated by the DECT forum with the aim of proposing new capabilities for home communications; it offers in particular, via standardized profiles and messages, options for managing audio communication, but also for controlling sensors in the local area network, etc. In particular, the DECT-ULE standard forms part of the CAT-iq specifications (version 4.0) and is particularly well suited to home automation-type services (since these exhibit low consumption). This module is optional in the case where the module WIFI is used (and vice versa).
- a module TTSUR for processing overvoltages on the electronic cards of the home gateway; this module makes it possible in particular to detect the occurrence of lightning.
- a software module TTNOT able to perform a certain number of actions to be performed upon reception of an alert message (for example: isolation of the ADSL line, switching off, audible or visual warning of the user, etc.). This module, which is optional, may be configured before the implementation of the invention as such. If it is not present, the actions to be performed are automatic (e.g. systematic cutting of the ADSL line).
- a software module NOTIF able to send alert messages using one of the communication modules available to it: either the module WIFI for communicating Wi-Fi alert messages, or the module CATIQ for communication of DECT type (it is possible, using CATIQ, to transmit messages to the devices of the local area network, but also to the other home gateways, on the condition that they are located within the range of the DECT communications, which range is greater than that of the Wi-Fi). Such a message may be inserted into a profile of the CAT-iq standard.
- a module MODI able to perform physical isolation of the ADSL line, either upon intervention by the user after he has been warned of an imminent lightning strike, or automatically upon reception of an alert message.

The service gateway according to the invention may also contain other modules, such as a hard disk, not shown, for storage, other modules enabling it to communicate externally via various protocols on various physical links, etc.

Figure 3:
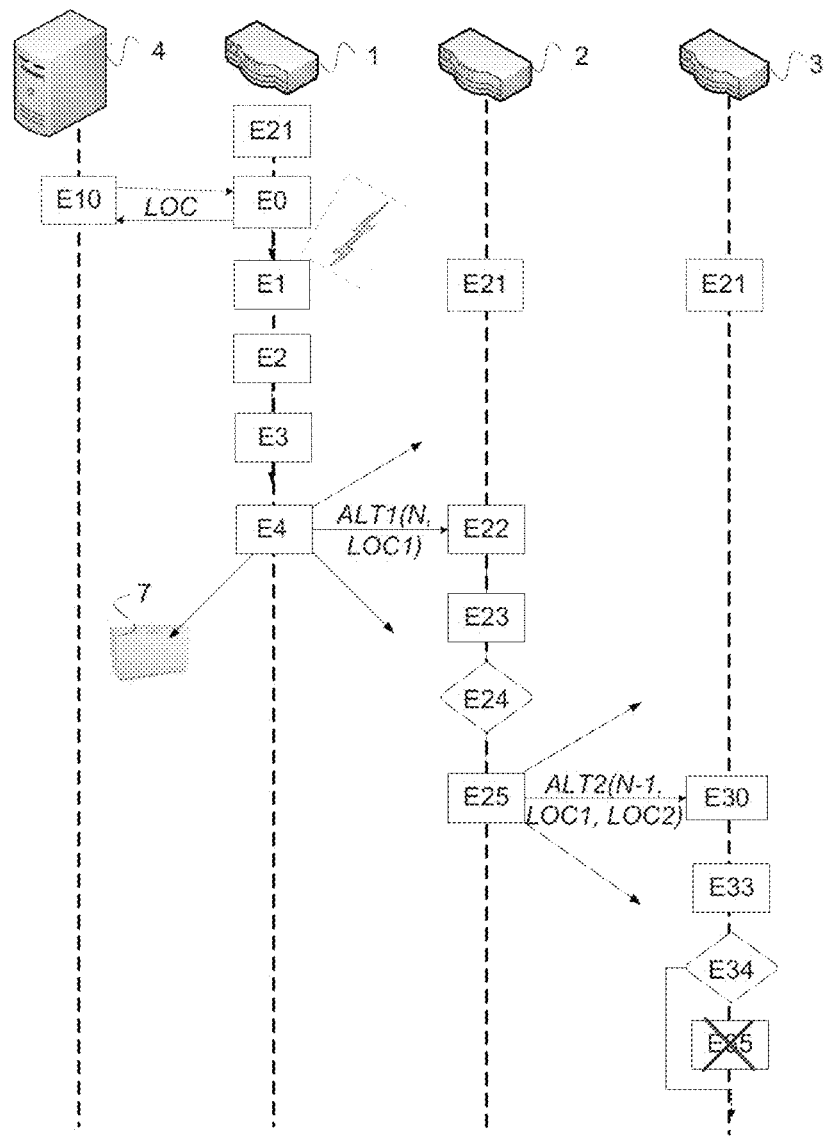
FIG. 3 shows the steps of the method according to one particular embodiment.

FIG. 3 shows the steps of the method according to one particular embodiment of the invention. It returns to the context of the embodiment provided in FIG. 1.

During an optional step E0, the server 4 of the operator managing the home gateways (1,2,3) determines the geographical coordinates of the first gateway (1) with the aid of its address, or its identification, transmitted with the message. This step may be performed simply by consulting the database of the Internet operator.

During a step E1, the first gateway (1) is hit by lightning.

During a step E2, the overvoltage detection module TTSUR of the first gateway (1) identifies damage to an electronic card, linked to the lightning.

During a step E3, the gateway prepares an alert message for the nearby gateways, and optionally the other devices of its local area network (terminals, sensor, etc.). This alert message includes for example the following fields:
- type of message (lightning overvoltage, fire, earthquake, etc.);
- unique message identifier, so that resending to the sending gateway is not taken into consideration (or alternatively, identification of the sending gateway);
- counter N of the maximum number of retransmissions so as to limit the number of successive despatches of alert messages between the gateways;
- optionally, date and time of the message;
- optionally, location (LOC1) of the sending gateway (for example its GPS coordinates). This location may be acquired by contacting the servers (4) of the operator; for example the gateway contacts a first identification server (of 'Wassup' type) in order to acquire its address, then a second server in order to carry out the transformation of the acquired address into geographical coordinates, for example GPS. These coordinates are then retained in the gateway for later use. By having the GPS coordinates of the gateway and by conveying them in the alert message, it is possible, for the receiver, to calculate the proximity of the lightning and to inform the user thereof. By using the GPS coordinates conveyed by a plurality of alert messages received from various gateways, it is also possible to calculate whether the storm is approaching or moving away, at what speed it is moving, etc., in order to enhance the notifications presented to the user.

According to one variant, not shown, it is also possible to provide a centralized solution for the gateways still having a connection to the WAN network. It is then the central server that propagates the alerts in a defined geographical zone around the gateways that relayed a lightning alert, by virtue of the calculated GPS coordinates.

During a step E4, the alert message is sent (broadcast or transmitted point-to-point if the variant proposed above is used) via the module NOTIF of the gateway, either using Wi-Fi, or using DECT via the module CATIQ.

According to one variant, not shown, the home gateway identifies the nearby gateways; this variant enables knowledge of the proximate gateways and makes it possible to address the message to them in point-to-point (and not broadcast) mode. This operation may be carried out by contacting the servers (4) of the operator; for example, the gateway contacts one of the servers of the operator, which returns to said gateway a list of the nearby gateways, in the form of a unique gateway identifier (IP address, SSID, etc.).

During a step E22, the second home gateway (2), which is near the first, receives the alert message by virtue of its radio reception module (Wi-Fi or CAT-iq).

During a prior and optional step E21, the gateway 2 acquired rules to be observed in the case of reception of such a message. These rules enable it to carry out the appropriate action during step E22: for example, the gateway notifies the user of the presence of lightning nearby. This notification may be presented on the screen of the gateway or on a television set associated with the gateway (on the condition that it has corresponding software means), or on a display of the freezer; according to one variant, the gateway is itself also able to protect itself (this variant preferably being authorized by the user).

During a step E23, the gateway decrements the resend counter N, and then tests the value thereof; if the value of the counter is not zero, this signifies that the maximum number of resends has not yet been reached, and therefore the gateway retransmits the alert message to the proximate terminals in the same manner as the first gateway in step E4 (only the value of the counter changes in this example).

By contrast, if the value of the counter is zero (E33, E34), the gateway processes the information contained in the message (notification of the user, etc.) but does not propagate the information since it does not resend the alert message. This is the case for the third gateway (3) in steps E30 to E34 (step E35 is not carried out).

It goes without saying that the embodiment that has been described above has been given purely by way of wholly non-limiting indication, and that numerous modifications may easily be made by those skilled in the art without, however, departing from the scope of the invention.

The invention claimed is:

1. A method for managing alerts relating to detection of a local phenomenon in a wide area communications network comprising at least one first home gateway, which is able to send alert messages in the network, the local phenomenon being liable to damage hardware and/or software resources of said first home gateway, wherein the method comprises the first home gateway performing the following acts:
    detecting, by the first home gateway, damage linked to the local phenomenon; and
    sending, by said first home gateway, in the network, an alert message for management of the local phenomenon by at least one second home gateway, able to receive the alert message, near said first home gateway in the wide area network.

2. The alert management method as claimed in claim 1, wherein the message is sent by way of a radio communication channel, and the second home gateway is near the first if it is located within a range of the radio communication.

3. The alert management method as claimed in claim 2, wherein the alert message is broadcast in a home network of the first home gateway.

4. The alert management method as claimed in claim 1, further comprising acquiring at least one identifier of a nearby home gateway situated at a distance shorter than a threshold distance.

5. The alert management method as claimed in claim 1, wherein the act of detecting damage is performed directly by the first home gateway.

6. The alert management method as claimed in claim 1, wherein the act of detecting damage is performed by reception of at least one alert message.

7. The alert management method as claimed in claim 1, wherein the alert message comprises a unique message identification.

8. The alert management method as claimed in claim 1, wherein the alert message comprises a counter relating to a maximum number of resends of the alert message.

9. The alert management method as claimed in claim 8, wherein the alert message is resent by a receiving home gateway as long as the number of resends has not reached a threshold value.

10. The alert management method as claimed in claim 1, further comprising:
    locating the first home gateway;
    transmitting this location in combination with the alert message.

11. An appliance able to send alert messages relating to detection of a local phenomenon in a wide area communications network, the local phenomenon being liable to damage hardware and/or software resources of a first home gateway including the appliance, wherein the appliance comprises:
    a processor; and
    a non-transitory computer-readable medium comprising instructions stored thereon, which when executed by the processor configure the appliance to perform acts comprising:
        detecting damage linked to the local phenomenon; and
        sending an alert message for management of the local phenomenon by at least one second home gateway, able to receive the alert message, near the first home gateway in the wide area network.

12. The first home gateway comprising the appliance as claimed in claim 11.

13. A non-transitory computer-readable medium comprising a computer program stored thereon and including code instructions for implementing an alert management method when the instructions are executed by a processor of a first home gateway, the alerts relating to detection of a local phenomenon in a wide area communications network comprising the first home gateway, which is able to send alert messages in the network, the local phenomenon being liable to damage hardware and/or software resources of said first home gateway, wherein the method comprises the first home gateway performing the following acts:
    detecting, by the first home gateway, damage linked to the local phenomenon; and
    sending, by said first home gateway, in the network, an alert message for management of the local phenomenon by at least one second home gateway, able to receive the alert message, near said first home gateway in the wide area network.

* * * * *